US007659919B2

United States Patent
Bowen et al.

(10) Patent No.: US 7,659,919 B2
(45) Date of Patent: Feb. 9, 2010

(54) MOBILE TELEVISION CHANNEL SWITCHING SYSTEM AND METHOD

(75) Inventors: Toby John Bowen, Durham, NC (US); Wiilliam O. Camp, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 959 days.

(21) Appl. No.: 11/162,015

(22) Filed: Aug. 25, 2005

(65) Prior Publication Data

US 2007/0067815 A1  Mar. 22, 2007

(51) Int. Cl.
H04N 7/14 (2006.01)
(52) U.S. Cl. .................. 348/14.02; 348/731; 348/387.1
(58) Field of Classification Search .............. 348/14.01, 348/14.02, 387.1, 731
See application file for complete search history.

(56) References Cited

U.S. PATENT DOCUMENTS

2005/0174483 A1  8/2005  Ruckriem

OTHER PUBLICATIONS

Sony Ericsson Mobile Communications AB, International Preliminary Report on Patentability, corresponding to International Patent Application No. PCT/US2006/007072, dated Mar. 6, 2008.
Sony Ericsson Mobile Communications AB, International Patent Application Ser. No. PCT/US2006/007072, International Search Report, Jul. 24, 2006.
Sony Ericsson Mobile Communications AB, International Patent Application Ser. No. PCT/US2006/007072, Written Opinion, Jul. 24, 2006.

Primary Examiner—Stella L Woo
(74) Attorney, Agent, or Firm—R. Brian Drozd; Moore & Van Allen, PLLC

(57) ABSTRACT

Presented is a method of displaying a newly requested channel in a mobile TV device prior to retuning the mobile TV device to the newly selected channel. The mobile TV device demodulator and tuner are cycled on for a short period of time at regular intervals to conserve battery power. Data is buffered from multiple channels in a buffer within the mobile TV device while the demodulator is cycled on. The mobile TV device displays data from one of the buffered channels upon a request to switch to the channel prior to retuning the mobile TV device to the newly selected channel. The mobile TV device is then retuned to the newly selected channel at the next instance the demodulator and tuner are cycled on.

18 Claims, 4 Drawing Sheets

MOBILE TELEVISION CHANNEL SWITCHING SYSTEM AND METHOD

BACKGROUND OF THE INVENTION

The present invention relates to portable mobile communications devices and systems, and more particularly to a portable mobile communications device, system and method that can receive television broadcast signals.

Portable mobile communications devices such as mobile phones are becoming more sophisticated and include many new features and capabilities. One such feature is the capability to receive mobile broadcast television signals or mobile television or the like, such as digital video broadcast-handheld (DVB-H), digital media broadcast (DMB), integrated services digital broadcast-terrestrial (ISDB-T) or similar technologies.

The DVB-H standard reduces power consumption and extends battery life by using a time sliced format to transfer one of many data channels to a mobile device. For instance, the radio and demodulator associated with the television portion of the mobile device are only powered on for relatively short periods of time (i.e., 0.1 seconds) while they remain powered off for longer periods of time (i.e. 1 to 5 seconds). Thus, the ratio between on/off of the radio and demodulator can range from 10:1 to 50:1 while the interval between on cycles can vary from 1.0 to 5.0 seconds.

The drawback to this power save method is that the time required to switch from one channel to another channel is noticeably and annoyingly long for the user/viewer. Conversely, leaving the radio and demodulator powered on all the time to capture and buffer all available channels will drastically affect the battery life of the device.

Currently, there are no provisions addressing the user's dilemma described above. What is needed is a mechanism that allows the user to shorten the time it takes to change channels without overly affecting the battery life of the mobile device.

BRIEF SUMMARY OF THE INVENTION

In accordance with an embodiment of the present invention, there is described a method and computer program product for displaying a newly requested channel in a mobile TV device prior to retuning the mobile TV device to the newly selected channel. The mobile TV device demodulator and tuner are cycled on for a short period of time at regular intervals to conserve battery power. Data is buffered from multiple channels in a buffer within the mobile TV device while the demodulator is cycled on. The mobile TV device displays data from one of the buffered channels upon a request to switch to the channel prior to retuning the mobile TV device to the newly selected channel. The mobile TV device is then retuned to the newly selected channel at the next instance the demodulator and tuner are cycled on.

The number of multiple channels being buffered is not necessarily fixed. In one embodiment, the number of channels being buffered is three and the three channels are sequential in a channel lineup. The currently camped on channel can be the lower, middle, or upper channel in the channel lineup.

In another embodiment, the multiple channels being buffered represent favorite channels programmed into the mobile TV device.

In still another embodiment, the multiple channels being buffered represent channels frequently tuned to as learned by the mobile TV device. The channels can automatically change according to a profile developed by the mobile TV device.

DETAILED DESCRIPTION OF THE INVENTION

Figure 1:
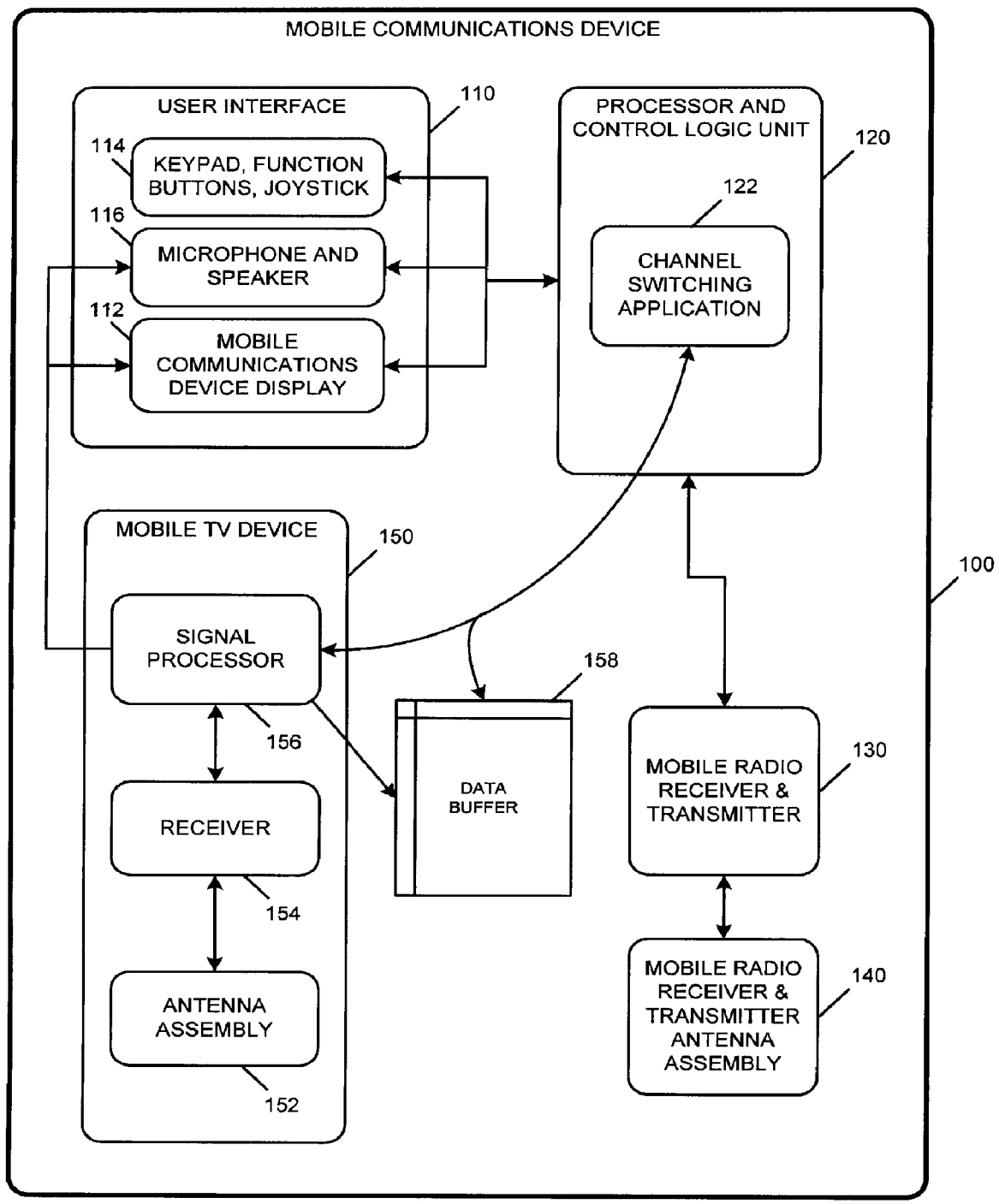
FIG. 1 is a block diagram of an exemplary portable mobile communications device for switching television channels more quickly in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary portable mobile communications device for switching television channels more quickly in accordance with an embodiment of the present invention. The design of the portable mobile communications device 100 illustrated in FIG. 1 is for purposes of explaining the present invention and the present invention is not limited to any particular design.

The portable mobile communications device 100 may include an operator or user interface 110 to facilitate controlling operation of the portable mobile communications device 100 including initiating and conducting phone calls and other communications. The user interface 110 may include a display 112 to provide visual signals to a subscriber, viewer, or user as to the status and operation of the portable mobile communications device 100. The display 112 may be a liquid crystal display (LCD) or the like capable of presenting color images. The display 112 may provide information to a user or operator in the form of images, text, numerals, characters, a graphical user interface (GUI) and the like. The display 112 may also be used to present programming carried by broadcast mobile television signals.

The user interface 112 may also include a keypad and function keys or buttons 114 including a pointing device, such as a joystick or the like. The keypad, function buttons and/or joystick 114 permit the user to communicate commands to the portable mobile communications device 100 to dial phone numbers, initiate and terminate calls, establish other communications, such as access a mobile TV provider, the Internet, send and receive email, text messages and the like. The keypad, function buttons, and/or joystick 114 may also be used to control other operations of the portable mobile communications device 100. The keypad, function buttons, and/or joystick 114 may also be implemented and combined on a touch sensitive display to receive tactile input.

The display 112, keypad, and function buttons 114 may be coupled to a main processor and control logic unit 120. The processor and control logic unit 120 may be a microprocessor or the like. The processor and logic unit 120 may include an application 122 for switching channels more quickly. The functions and operations described with respect to a portable mobile communications device 100 in method 400 of FIG. 4 may be embodied in the application 122 for switching channels more quickly. The switching channels application 122 may be embodied in hardware, firmware, software (data structures) or combinations thereof. The processor and logic unit 120 may also include other data structures, software programs, computer applications and the like to encode and decode control signals; perform communication procedures and other functions as described herein.

The user interface 110 may also include a microphone and a speaker 116. The microphone 116 may receive audio or acoustic signals from a user or from another acoustic source. The microphone 116 may convert the audio or acoustic signals to electrical signals. The microphone 116 may be connected to the processor and logic unit 120 wherein the processor and logic unit 120 may convert the electrical signals to baseband communication signals. The processor and control logic unit 120 may be connected to a radio transmitter 130 that may convert baseband signals from the processor and control logic unit 120 to radio frequency (RF) signals. The radio transmitter 130 may be connected to an antenna assembly 140 for transmission of the RF signals to a communication medium or system, such as a mobile radio access network (MRAN) or the like.

The antenna assembly 140 may receive RF signals over the air and transfer the RF signals to a radio receiver 130. The radio receiver 130 may convert the RF signals to baseband signals. The baseband signals may be applied to the processor and control logic unit 120 which may convert the baseband signals to electrical signals. The processor and control unit 120 may send the electrical signals to the speaker 116 which may convert the electrical signals to audio signals that can be understood by the user.

The portable mobile communications device 100 may also include a mobile TV device 150. The mobile TV device 150 may be a DVB-H type device or the like. The mobile TV device 150 may be integrally formed as part of the portable mobile communications device 100 or may be a separate unit that may be connected and operate in association with the portable mobile communications device 100. The mobile TV device 150 may include an antenna assembly 152 for receiving broadcast signals of programming from a mobile TV broadcast network, broadcast radio access network (B-RAN) or the like. A receiver 154 may be coupled to the antenna assembly 152 to receive the broadcast signals. A signal processor 156 may receive the broadcast signals from the receiver 154 and convert the signals to a format for video presentation on the display 112 and audio output on speaker 116 of the portable mobile communications device 100.

A data buffer 158 may also be present to store or buffer data representative of broadcast mobile television signals on television channels that are not necessarily the television channel to which the mobile TV device 250 is currently tuned. The data buffer 158 is coupled with the application 122 for switching channels more quickly and the signal processor 156 of the mobile TV device 150.

Figure 2:
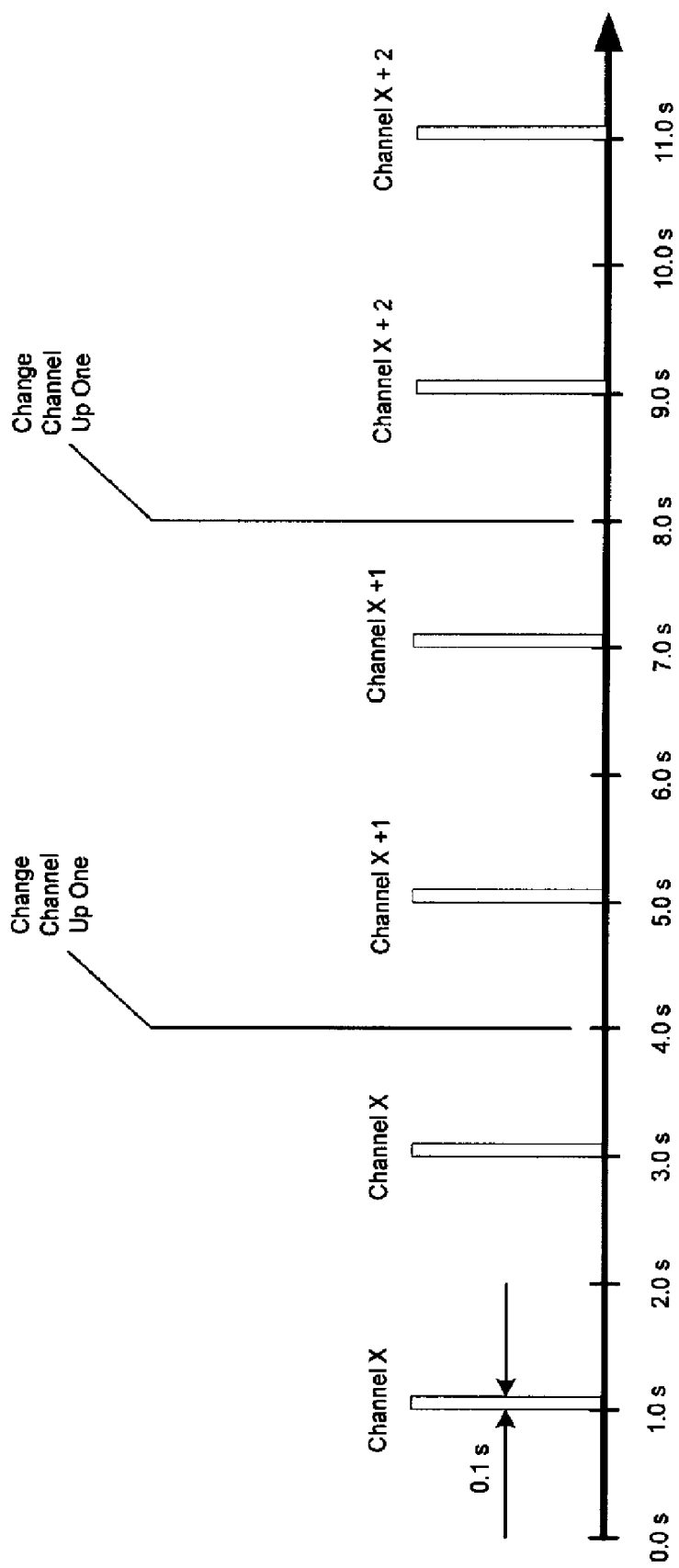
FIG. 2 is a prior art block diagram illustrating the timing involved in switching channels from one mobile broadcast television program to another.

FIG. 2 is a prior art block diagram illustrating the timing involved in switching channels from one mobile broadcast television program to another. The DVB-H mobile television standard reduces power consumption and extends battery life by using a time sliced format to transfer one of many data channels to a mobile device. For instance, the radio and demodulator associated with the television portion of the mobile device are only powered on for relatively short periods of time (i.e., 0.1 seconds) while they remain powered off for longer periods of time (i.e. 1 to 5 seconds). Thus, the ratio between on/off of the radio and demodulator can range from 10:1 to 50:1 while the interval between on cycles can vary from 1.0 to 5.0 seconds. This results in a significant and annoying lag time when switching channels. The delay between retuning from the old channel to the new channel can be a few seconds.

This is illustrated on the timeline of FIG. 2. The mobile TV device is camped on and currently displaying channel X. Since the tuner/demodulator are only on for a fraction of time, the mobile TV device must wait until the next on cycle in order to perform any commands or instructions initiated by the user/viewer via the user interface. Thus, a channel switch request can take up to 2 seconds according to FIG. 2.

Figure 3:
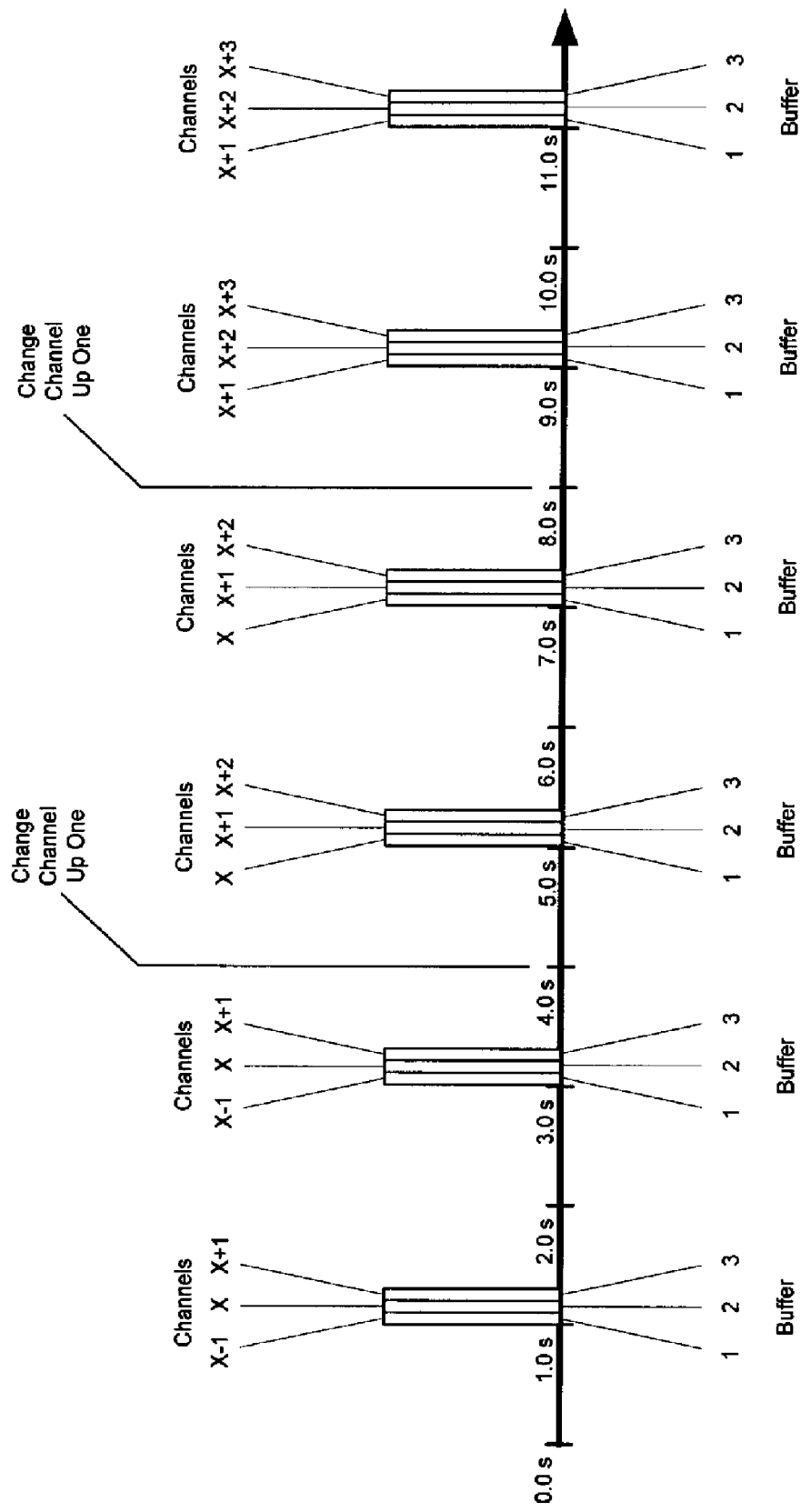
FIG. 3 is a block diagram illustrating the timing involved in switching channels from one mobile broadcast television program to another according to an embodiment of the present invention.

FIG. 3 is a block diagram illustrating the timing involved in switching channels from one mobile broadcast television program to another according to an embodiment of the present invention. In this timing diagram, the mobile TV device not only buffers data for the currently camped on channel but also for the channels immediately preceding and succeeding the current channel. In this scenario the user/viewer can retune the mobile TV device to the next or last channel in the channel lineup without experiencing a bothersome delay in the presentation of the program on the mobile TV device's display. Each time the user/viewer switches from the current channel to a new channel, the mobile TV device alters the data it buffers to reflect the new channel and the channels immediately preceding and succeeding the new channel.

Figure 4:
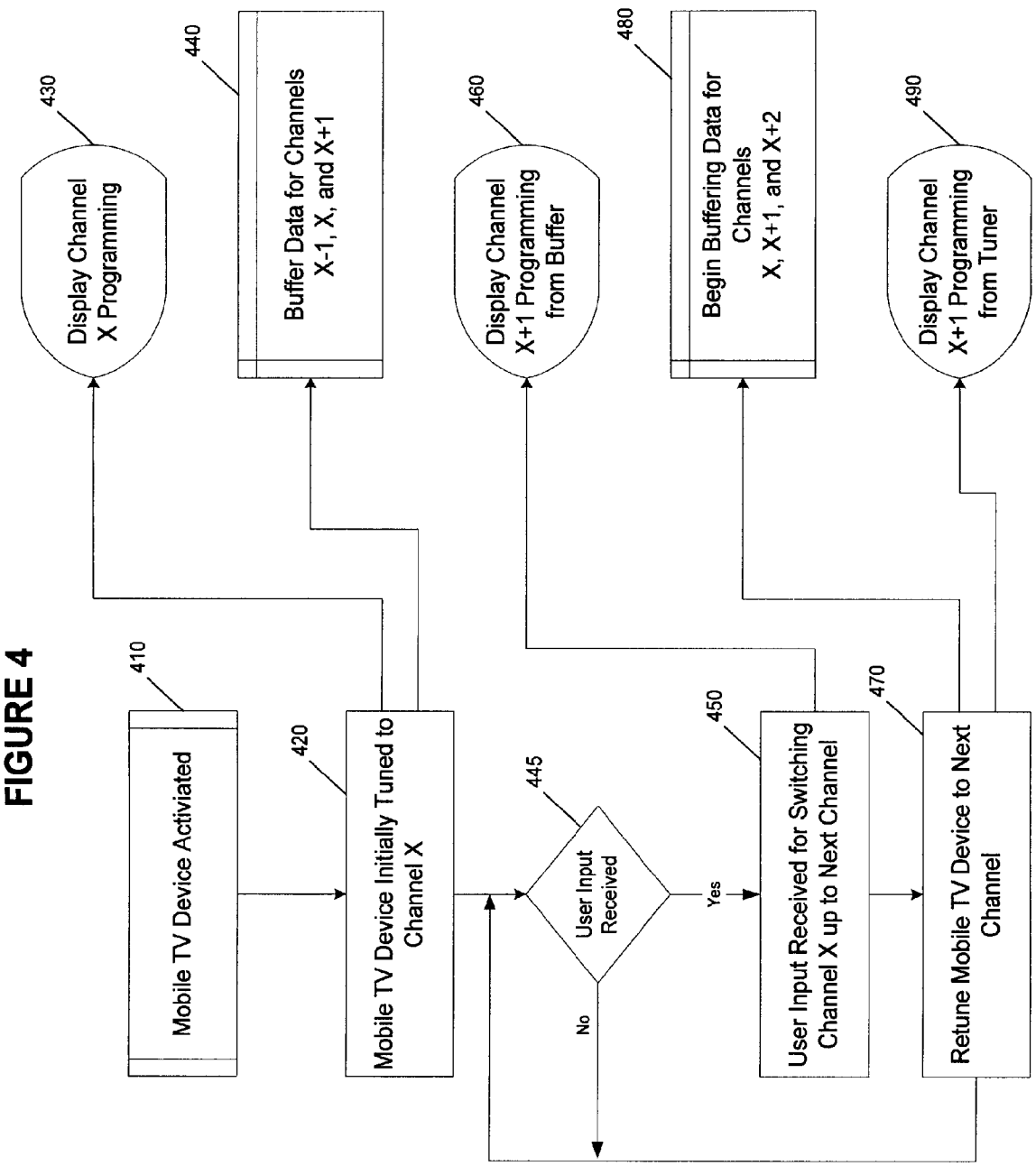
FIG. 4 is a flowchart describing the channel switching application according to an embodiment of the present invention.

FIG. 4 is a flowchart describing the channel switching application according to an embodiment of the present invention. In block 410, the mobile TV device is activated, In block 420, the mobile TV device is initially tuned to or camped on channel X. In block 430, the mobile TV device displays the programming being received on channel X. In block 440, the mobile TV device buffers data for channel X, the immediately preceding channel (X−1) and the immediately succeeding channel (X+1). The mobile TV device then operates in this fashion until a request, in the form of user input 445, to switch from the current channel is received by the mobile TV device as illustrated in block 450. In this example the request is to switch to the next channel up in the channel lineup. When this request is received the mobile TV device will immediately begin displaying the data for the newly requested channel (X+1) as shown in block 460. In block 470, the mobile TV device will retune to the newly desired channel (X+1) at the next instance that the modulator/tuner is cycled on according to the timing diagram in FIG. 3. In block 480, the mobile TV device will begin buffering data for the new channel (X+1) and the immediately preceding channel (X) and the immediately succeeding channel (X+2) in this instance. In block 490, the mobile TV device will display the program from the tuner since the buffer is no longer required upon successful retuning of the mobile TV device. The process can be repeated each time the user/viewer inputs a channel switch request. While not explicitly shown subsequent channel switch requests will increment the channels shown in FIG. 4 from X+2 to X+3, etc.

FIGS. 3 and 4 illustrate a scenario in which the channel data being buffered is comprised of the current channel and the channels immediately preceding and succeeding the current channel. This is but one possible implementation of the present invention and it is not to be construed as limiting the present invention in any way. For instance, the present invention could buffer the two succeeding channels in the available channel lineup if the user/viewer's pattern is to channel surf in an upward direction. Similarly, the present invention could buffer the two preceding channels in the available channel lineup if the user/viewer's pattern is to channel surf in a downward direction.

In addition, the number of channels to be buffered is not necessarily limited to three. The present invention can be implemented to buffer fewer channels or more channels. The greater the number of channels that are buffered the more of a drain on the battery. Thus, it becomes a design trade-off in selecting the number of channels to buffer.

Another embodiment can allow the user to identify and program favorite channels into the mobile TV device that are always buffered. The favorite channels do not necessarily need to be sequential in the channel lineup. This would allow the user/viewer to quickly tune to a favorite channel without significant delay. A favorite channel can include the previously viewed channel thereby allowing the user to 'jump' back and forth between the current channel and the previous channel.

Yet another embodiment can allow the mobile TV device to build a profile of viewing habits in order to identify favorite channels. For instance, the user/viewer may favor one or more weather channels during the early morning hours. Later in the day, the user/viewer's channel selection may favor sports channels while the evening preferences may include news channels. The mobile TV device can build a profile of the user/viewer's habits to identify the most likely channels to buffer based on the time of day.

The increments and intervals shown in FIGS. 2 and 3 are illustrative in nature and not intended to restrict the present invention in any way. Other mobile TV devices may use smaller or larger time intervals between power on cycles of the tuner/demodulator portion of the mobile TV device.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of displaying a newly requested channel in a mobile TV device prior to retuning the mobile TV device to the newly selected channel, wherein the mobile TV device demodulator and tuner are cycled on for a short period of time at regular intervals to conserve battery power, the method comprising:
    monitoring channels viewed on the mobile TV device and associated times that the channels are viewed;
    generating a profile of viewing habits based on the monitoring, the profile comprising most viewed channels during different times of day;
    buffering data from multiple channels in a buffer within the mobile TV device while the demodulator is cycled on, the multiple channels comprising the most view channels from the profile based on the current time of day;
    displaying data from one of the buffered channels upon a request received by the mobile TV device to switch to the channel having its data buffered prior to retuning the mobile TV device to the newly selected channel; and
    retuning to the newly selected channel at the next instance the demodulator and tuner are cycled on.

2. The method of claim 1 wherein the number of multiple channels being buffered is three.

3. The method of claim 2 wherein the three channels being buffered are sequential in a channel lineup.

4. The method of claim 3 wherein the three channels being buffered are sequential in a channel lineup and the currently camped on channel is the middle channel in the channel lineup.

5. The method of claim 3 wherein the three channels being buffered are sequential in a channel lineup and the currently camped on channel is the lower channel in the channel lineup.

6. The method of claim 3 wherein the three channels being buffered are sequential in a channel lineup and the currently camped on channel is the upper channel in the channel lineup.

7. The method of claim 1 wherein the multiple channels being buffered represent favorite channels programmed into the mobile TV device.

8. The method of claim 1 wherein the profile comprises most viewed channels during early morning hours, most viewed channels during afternoon hours, and most viewed channels during evening hours.

9. The method of claim 8 wherein the buffered channels automatically change according to the profile generated by the mobile TV device.

10. A computer program product for displaying a newly requested channel in a mobile TV device prior to retuning the mobile TV device to the newly selected channel, wherein the mobile TV device demodulator and tuner are cycled on for a short period of time at regular intervals to conserve battery power, the computer program product comprising:
    computer program code for monitoring channels viewed on the mobile TV device and associated times that the channels are viewed;
    computer program code for generating a profile of viewing habits based on the monitoring, the profile comprising most viewed channels during different times of day;
    computer program code for buffering data from multiple channels in a buffer within the mobile TV device while the demodulator is cycled on, the multiple channels comprising the most view channels from the profile based on the current time of day;
    computer program code for displaying data from one of the buffered channels upon a request received by the mobile TV device to switch to the channel having its data buffered prior to retuning the mobile TV device to the newly selected channel; and
    computer program code for retuning to the newly selected channel at the next instance the demodulator and tuner are cycled on.

11. The computer program product of claim 10 wherein the number of multiple channels being buffered is three.

12. The computer program product of claim 11 wherein the three channels being buffered are sequential in a channel lineup.

13. The computer program product of claim 12 wherein the three channels being buffered are sequential in a channel lineup and the currently camped on channel is the middle channel in the channel lineup.

14. The computer program product of claim 12 wherein the three channels being buffered are sequential in a channel lineup and the currently camped on channel is the lower channel in the channel lineup.

15. The computer program product of claim 12 wherein the three channels being buffered are sequential in a channel lineup and the currently camped on channel is the upper channel in the channel lineup.

16. The computer program product of claim 10 wherein the multiple channels being buffered represent favorite channels programmed into the mobile TV device.

17. The computer program product of claim 10 wherein the profile comprising most viewed channels during early morning hours, most viewed channels during afternoon hours, and most viewed channels during evening hours.

18. The computer program product of claim 17 wherein the buffered channels automatically change according to the profile generated by computer program code in the mobile TV device.

* * * * *

UNITED STATES PATENT AND TRADEMARK OFFICE
CERTIFICATE OF CORRECTION

PATENT NO. : 7,659,919 B2
APPLICATION NO. : 11/162015
DATED : February 9, 2010
INVENTOR(S) : Bowen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Thirtieth Day of November, 2010

David J. Kappos
*Director of the United States Patent and Trademark Office*